United States Patent [19]
Jurca

[11] Patent Number: 5,285,020
[45] Date of Patent: Feb. 8, 1994

[54] CONTROL SYSTEM FOR WEIGHING OF LOAD IN HYDRAULICALLY OPERATED LIFT ASSEMBLY

[75] Inventor: Zeljko T. Jurca, Etobicoke, Canada

[73] Assignee: Alert-O-Brake Systems, Inc., Mississauga, Canada

[21] Appl. No.: 916,665

[22] Filed: Jul. 22, 1992

[51] Int. Cl.⁵ .................. G01G 19/08; G01G 19/10
[52] U.S. Cl. ................... 177/139; 177/141; 177/146
[58] Field of Search ............... 177/139, 141, 146

[56] References Cited

U.S. PATENT DOCUMENTS

| | | |
|---|---|---|
| 4,055,255 | 10/1977 | Vasquez . |
| 4,230,196 | 10/1980 | Snead . |
| 4,403,680 | 9/1983 | Hillesheimer .......... 177/146 |
| 4,499,960 | 2/1985 | Ehrich et al. . |
| 4,771,837 | 9/1988 | Appleton et al. ....... 177/139 |
| 4,792,004 | 12/1988 | Sheffield . |
| 4,981,186 | 1/1991 | Shankle et al. . |
| 5,004,392 | 4/1991 | Naab ...................... 177/139 X |
| 5,038,876 | 8/1991 | Smith ..................... 177/139 |
| 5,065,829 | 11/1991 | Smith I ................... 177/139 |
| 5,139,101 | 8/1992 | Smith II .................. 177/139 |

FOREIGN PATENT DOCUMENTS 58-17321 2/1983 Japan .

Primary Examiner—George H. Miller, Jr.
Attorney, Agent, or Firm—Ridout & Maybee

[57] ABSTRACT

A hydraulic by-pass control system is provided in the hydraulically operated lift assembly of a loader which uses double-acting hydraulic cylinders. The by-pass control system provides a low-resistance alternative pathway between the lowering circuit of the lift assembly and the hydraulic fluid tank. Accurate weighing measurement of the load on the lifting arms of the loader may be achieved by temporarily opening the alternative low-resistance pathway, thereby effectively converting the hydraulic circuit to a single-acting configuration during the taking of load cell signal measurements of back-pressure in the lift circuit.

8 Claims, 4 Drawing Sheets

CONTROL SYSTEM FOR WEIGHING OF LOAD IN HYDRAULICALLY OPERATED LIFT ASSEMBLY

BACKGROUND OF THE INVENTION

1. Field of the Invention

The invention is directed generally to a modification of the standard hydraulic circuitry which uses double-acting cylinders in the lift mechanism of mobile material handling equipment, such as front- or rear-end loading waste disposal vehicles. In particular, the invention relates to hydraulic circuitry in such material handling equipment including an electrically operated dump valve in the fluid return line of the double-acting cylinders to cause to them to act temporarily as single-acting cylinders during the measurement of weight-proportional signals from transducers operatively mounted to the cylinders to measure pressure in the lift line thereof. By providing fluid in the cylinder return line with a low resistance pathway, one avoids the pressure variations which are characteristic of double-acting cylinders and detrimental to obtaining accurate measurements of the load applied to the lifting forks of the equipment.

2. Prior Art

In certain mobile equipment for lifting heavy loads, for example fork lifts, a lifting assembly using "single-acting" hydraulic lift cylinders may be employed. In such equipment, the cylinders are called upon either to pull or push the lifting arms, but not both, gravity return being relied on to lower the load.

In a single-acting cylinder, hydraulic fluid force is exerted against one side only of the piston during lifting, forcing the piston rod to extend from the cylinder housing. The cylinder is dry on the opposite side of the piston. When the hydraulic fluid pressure between the lift control valve and the lift cylinder, i.e. the back-pressure, is released the weight of the load and lifting arms causes the piston rod to retract.

It is well known to provide pressure transducer means (e.g. a load cell) at the inlet of the hydraulic lift cylinders (i.e. in the lift circuit) in mobile lifting equipment to produce an electrical signal which measures the back-pressure developed when the lifting arms bearing the load are at some suitable intermediate position, the back-pressure in turn being simply related to the weight of the load. The use of analog/digital converter means for converting transducer-generated analog signals corresponding to the fluid pressure on the transducer means in mobile lifting equipment is illustrated, for example, in the refuse collection vehicle of U.S. Pat. No. 5,038,876 (Smith).

In many front-end loaders, the hydraulic system utilizes double-acting cylinders for better lifting and lowering control and more rapid functioning in the return cycle. The pivotal lifting arms of refuse collection vehicles, as a principal example, must lift the load of waste up and over through more than 90° to transfer collected solid waste from the container into the hopper of the dumpster, so that double-acting cylinders must be used. Hydraulic pressure fluid exerts force on one side of the piston when raising and dumping the waste container and on the other side of the piston to bring the lift arms back and lower the empty container to the ground.

Accuracy in weighing a container picked up by a refuse vehicle when full, and then when empty, is of critical importance in proper waste management. Unfortunately, the configuration of double-acting lift cylinders, having hydraulic fluid on both sides of the its piston, results in the measured back-pressure on the lift circuit side not being reproducible for equal loads held at equal elevations, by reason of variability in the cylinder pressure on the opposite (return line) side of the cylinder. This variability depends, at least, upon the speed at which the equipment operator raises the load to a weighing position using the hydraulic control valve and upon the operating speed of the engine driving the hydraulic pump.

It is an object of the present invention to provide a modification of the hydraulic control system of a front-end loader or similar loading equipment employing double-acting cylinders in the lift mechanism, which provides for enhanced accuracy in weighing a load carrier or container by eliminating the aforementioned variability in cylinder pressure as a source of inconsistent back-pressure readings.

It is a further object of the invention to provide for automated weighing of the load picked up by a loader in conjunction with an on-board microprocessor having peripheral features for controlling of the hydraulic system during the weighing operation and for displaying a load weight reading through calibrated signal conversion means coupled to the output of a transducer responsive to the hydraulic pressure in the lift circuit of the hydraulic lift cylinder of the loader.

SUMMARY OF THE INVENTION

I have discovered that accurate weighing measurement of the load on the lifting forks of mobile equipment with a double-acting hydraulic cylinder circuit may be achieved by the temporary conversion of the circuit to a single-acting configuration during the taking of load cell signal measurements of back-pressure in the lift circuit.

With a view to overcoming the aforementioned source of inaccuracy in weighing a container and to achieving the aforementioned objects, the invention provides a low-resistance by-pass circuit in the hydraulically operated lift assembly of a loader employing double-acting cylinders. The by-pass circuit comprises a return line tapping off from the lifting circuit for each hydraulic cylinder in the lift assembly and normally-closed remote control valve means in that return line, operable to be opened when the lift arms of the loader are elevated to a predetermined reference weighing position. Undesirable pressure built-up in the lowering circuit is thereby avoided and a measurement of the hydraulic pressure in the lifting circuit then affords a load weight reading which is better representative of the actual weight of the load borne by the lift arms.

The improved control system of the present invention preferably includes microprocessor-controlled means responsive to the back-pressure signal from transducer means in the lift circuit for calculating and displaying the load weight. The same microprocessor may be used to control the valve of the by-pass circuit for automated opening of that valve while a load is being raised to the reference weighing position and is held there during measurement of the weight.

The system according to the invention preferably includes as well normally-open remote control valve means in the lift circuit, operable to be closed when the lift arm has been elevated to the predetermined weighing position, so that leakage of hydraulic fluid from the lift circuit during weighing is minimized.

BRIEF DESCRIPTION OF THE DRAWINGS

In the drawings consisting of FIGS. 1 to 4, like reference numerals are used throughout to refer to the same elements, wherein.

DETAILED DESCRIPTION OF THE INVENTION

Figure 1:
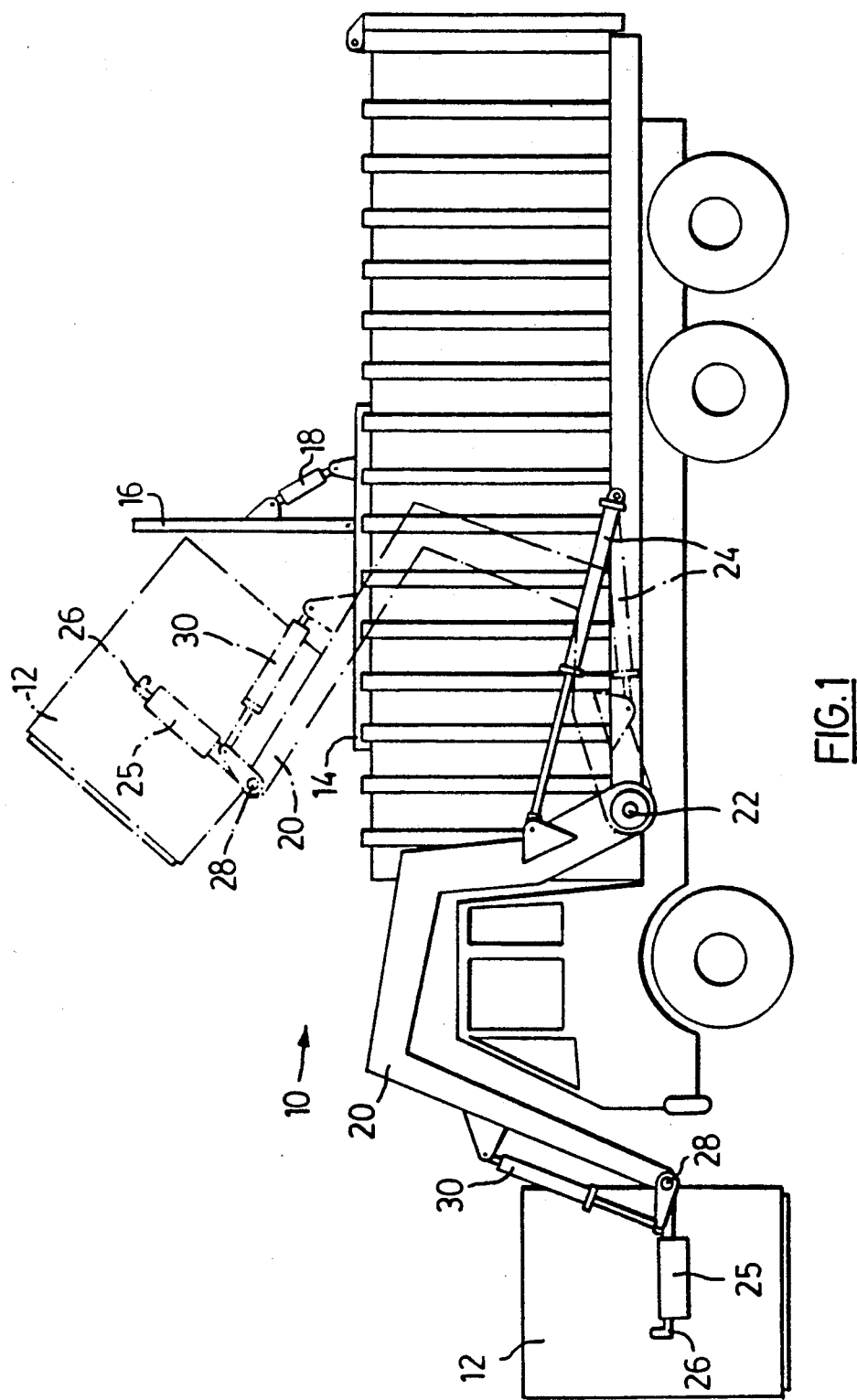
FIG. 1 is a side elevational view of a refuse truck with an hydraulically operated lift assembly engaging a refuse container.

FIG. 1 shows a known and conventional refuse truck 10 as an example of mobile lifting equipment in which the present invention finds application. A waste container 12 is engaged by the lift assembly of truck 10, the container and the lift assembly being shown in solid outline at the start of the dumping cycle when container 12 is resting on the ground, and in broken outline when the raised and inverted container is being emptied into the hopper 14 of truck 10, hopper cover 16 having been swung open by operation of hydraulic cylinder 18.

The lift assembly comprises a symmetrical pair of lifting arms 20 at opposite sides of the truck which raise the container 12 from the ground when caused to pivot about axis 22 by operation in one sense (retraction of piston rods) of corresponding hydraulic cylinders 24, hereinafter referred to as the "lift arm cylinders". Lifting sleeves 25 at opposite sides of container 12 are engaged by tilt forks 26 which can be pivoted about axis 28 by actuation of corresponding hydraulic cylinders 30, hereinafter referred to as the "tilt fork cylinders".

In operation, the tilt fork cylinders 30 serve to rotate the tilt forks 26 about axis 28 in the opposite sense (counterclockwise in the view of FIG. 1) to the (clockwise) rotation of the lift arms 20 about axis 22 while the container is being raised from the ground, so that the lifted container is maintained in an upright orientation until it has been moved over truck hopper 14, whereupon cylinders 30 are actuated so as to tilt the container and dump its waste contents into the hopper.

For the reasons noted above, the two lift arm cylinders and the two tilt fork cylinders in material handling equipment such as refuse truck 10 must be of the double-acting type, which provide force in both directions. Pressure oil enters at one end of each cylinder to extend it, at the other end to retract it.

Figure 2:
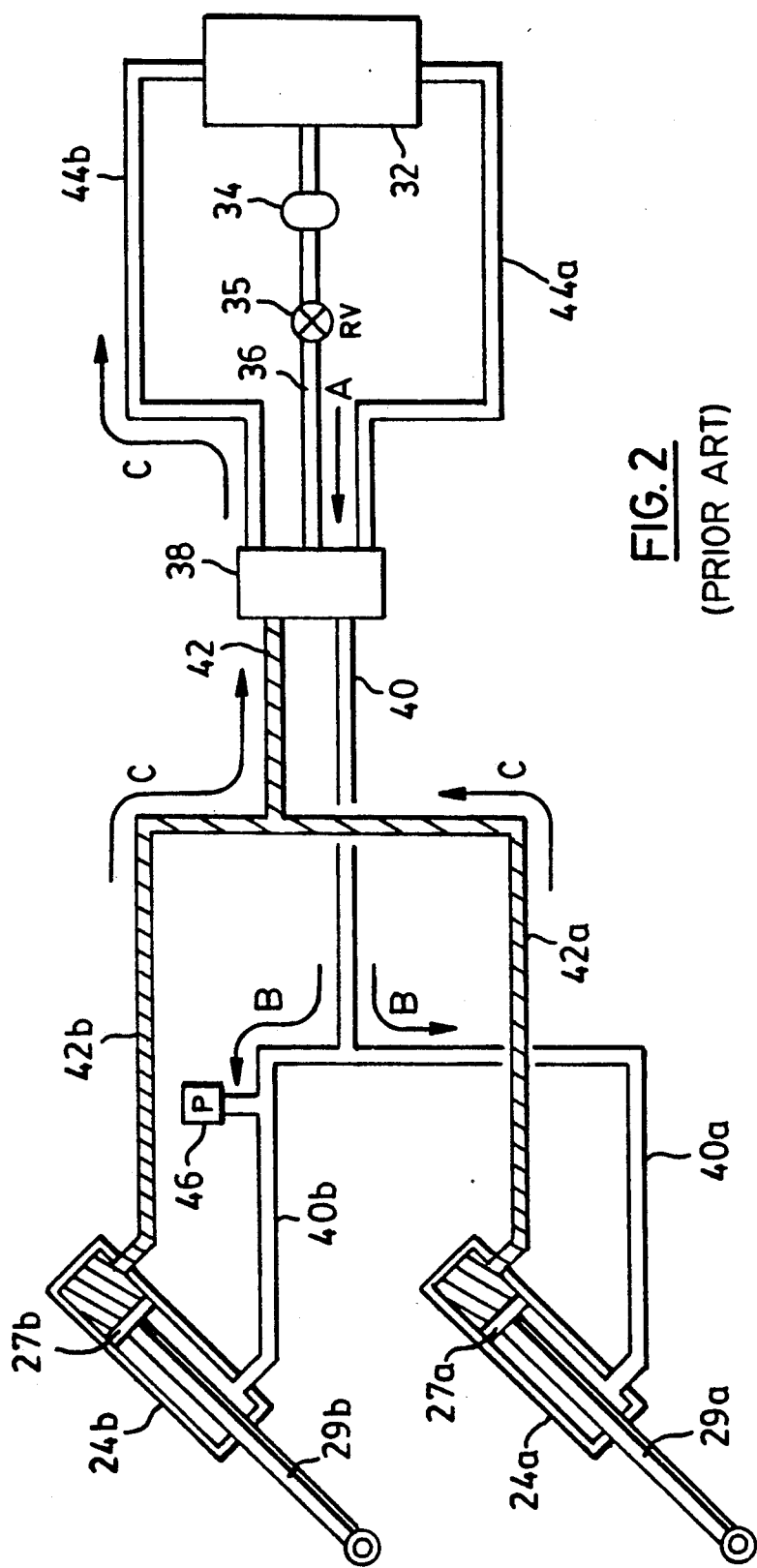
FIG. 2 is a schematic illustration of a conventional hydraulic system with double-acting cylinders for use in elevating, lowering and weighing the refuse container in the refuse vehicle of FIG. 1.

In FIG. 2, a known and conventional arrangement is shown for the hydraulic circuit components of the lift arm assembly used in the lifting apparatus of FIG. 1 and for pressure-sensitive transducer means used in weighing the load borne by the lift means. Both of the double-acting lift arm cylinders being shown in this depiction, they are labelled 24a and 24b to differentiate between them. Hydraulic fluid is pumped from hydraulic tank 32 by the hydraulic system pump 34 through inlet line 36 in direction A to the manually switchable hydraulic control valve 38, which has "lift" "neutral" and "lower" positions.

When the lift/lower valve 38 is switched from the neutral to the lift position, fluid from the pump 34 is directed under pressure through lifting circuit line 40 and its branch lines 40a and 40b (flow direction indicated by arrows B) exerting pressure against the rod-side faces of pistons 27a and 27b and retracting piston rods 29a and 29b, causing the lifting arms 20 to pivot towards the hopper of truck 10. At the same time, fluid from the opposite (lowering circuit) ends of cylinders 24a and 24b is forced out via branch lines 42a and 42b through line 42 and then through control valve 38 and return line 44b to the hydraulic tank 32 (arrows C).

Switching from the lift to the neutral position closes off inlet line 36 and return lines 44a and 44b of valve 38, thereby "dead-ending" the rest of the hydraulic circuit, so that the pistons are not driven in either direction. Then switching to the "lower" position permits hydraulic fluid to be pumped via lowering circuit line 40 into branch lines 42a and 42b, exerting pressure against the faces of pistons 27a and 27b opposite the piston rod and extending piston rods 29a and 29b to cause lifting arms 20 to pivot back towards the ground. Fluid displaced from the interior of cylinders 24a and 24b at the opposite side of the piston is forced back by way of lines 40a and 40b through line 40 and ultimately through return line 44a into tank 32.

Relief valve 35 in inlet line 36 between the pump 34 and the hydraulic control valve is a conventional safety valve which dumps fluid from the circuit if the hydraulic pressure reaches a level approaching the maximum specification for pump 34.

In refuse truck 10 of FIG. 1 having the hydraulic lift arm assembly of FIG. 2, the lifting arms are hydraulically raised by causing the cylinder rods to be retracted (pushed into the cylinder) and thereby pulling on the lifting arms. However, the general circuitry of FIG. 2 may also be used in mobile lifting equipment in which the lifting arms are raised by causing the cylinder rods to be extended (pushed out of the cylinder), thereby pushing the lifting arms about pivot points.

It is known to install an hydraulic gauge or transducer in the hydraulic system of a front loading material handling vehicle, responsive to the back-pressure in the lifting circuit of the lift arm cylinders, to measure the weight of various materials to be loaded and carried. In FIG. 2, reference numeral 46 indicates one possible location in the circuit for pressure sensor "P" to respond to the "back-pressure" in lift arm cylinders 24a and 24b.

Typically, a load cell or pressure transducer provides an analog electrical signal proportional to the loading sensed as the lifting arms bearing the load are held stationary at some reference displacement above the ground with the control valve in the "neutral" position to prevent hydraulic fluid from entering or leaving the lifting and lowering circuits. That analog electrical signal is generally converted by an analog/digital converter for tabulation and storage by a microprocessor.

Inaccuracy of measurement arises from a number of factors inherent in every hydraulic system, such as oil leakage. However, a particularly troublesome source of error can be attributed to the double-acting character of the cylinders in lifting equipment typified by the vehicle of FIG. 1.

Referring again to FIG. 2, pressure transducer P is shown connected into the circuitry for the measurement of the back-pressure developed in the lift ends of cylinders 24a and 24b when the load has been raised to a reference height and the lift/lower control valve 38 is switched to neutral to hold the load there. That switching has the effect of "trapping" any pressure differential developed between the lift end and the opposite end in each of cylinders 24a and 24b. Depending upon the speed with which the operator activates control valve 38, the engine speed and other indeterminate factors, an unpredictable pressure differential develops across the piston which may be positive, zero or negative when the load is brought to rest. This differential is too small to affect the normal lifting and lowering function of the circuit, but introduces a source of inaccuracy into the readings from transducer P and hence the measured load weight.

Figure 3:
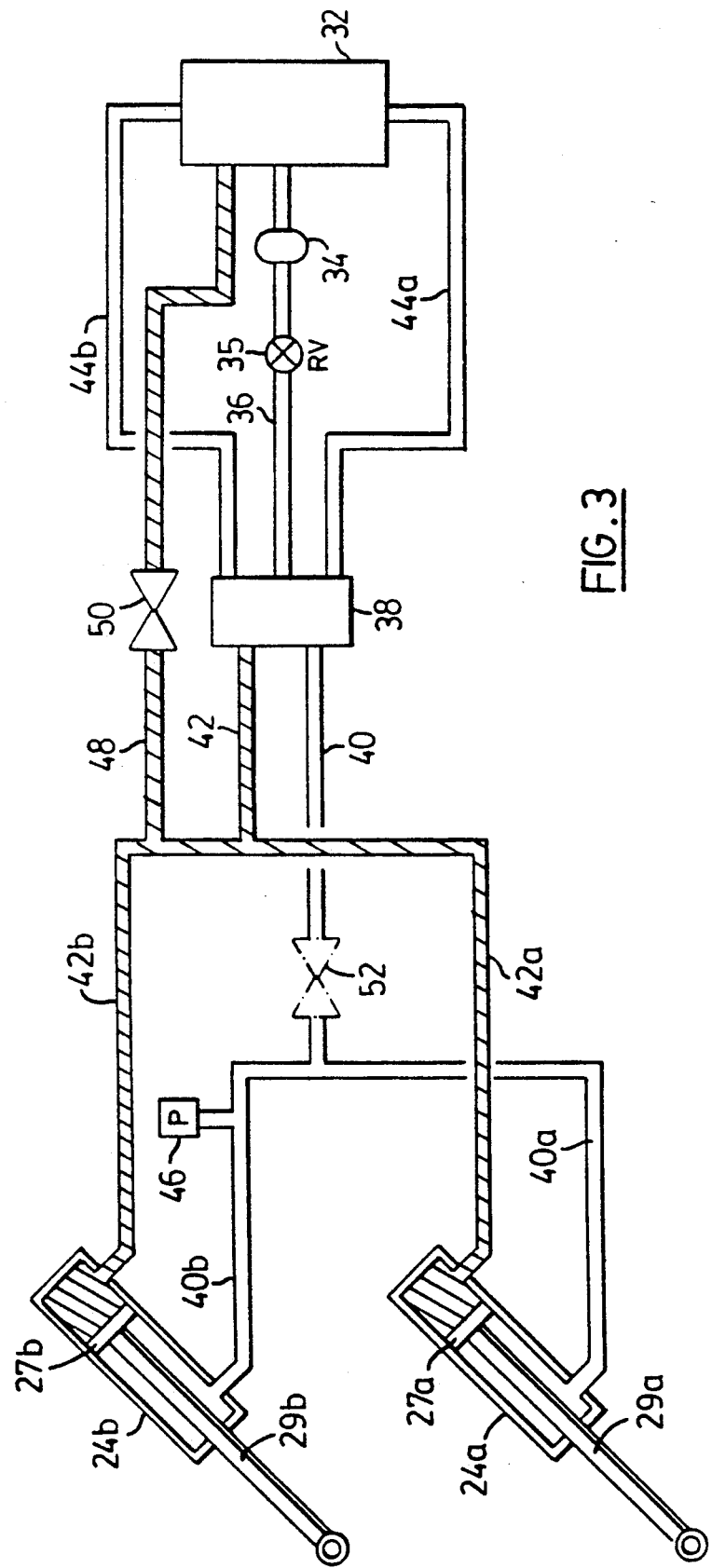
FIG. 3 is a schematic illustration of an hydraulic system according to a preferred embodiment of the present invention for use in elevating, lowering and weighing the refuse container in the refuse vehicle of FIG. 1.

FIG. 3 provides a schematic illustration of a modification of the conventional hydraulic system according to a preferred embodiment of the present invention. Components corresponding to those of the prior art system of FIG. 2 are given the same reference numerals in FIG. 3.

The essential improvement afforded by the system of the present invention resides in providing a low-resistance alternative flow pathway for fluid from the non-lifting ends of lift arm cylinders 24a and 24b, comprising a return line 48 to hydraulic tank 32 and normally-closed valve means 50 in line 48, preferably an electrically operated solenoid valve (NC).

Valve 50 is a "dump" valve operable to be open while lifting arms 20 are being raised to the reference height and held there during measurement of the load weight-related signal from transducer P, permitting fluid from the non-lifting ends of cylinders 24a and 24b to be dumped through line 48 into hydraulic tank 32. While valve 50 is actuated and open, cylinders 24a and 24b thus function essentially as single-acting cylinders and the aforementioned problem of varying and irreproducible pressure differentials across the pistons does not arise.

Because it is also important for accuracy in weighing a load to minimize leakage from the lifting circuit while a measurement of the load weight from cylinder back-pressure is being made, the system according to the invention preferably includes valve means operable to isolate the lifting circuit at that stage. For this purpose, valve 52 in line 40 is included in the hydraulic system of this invention, where cylinders 24a and 24b are the lift arm cylinders of a refuse truck or similarly operating front loading equipment. Valve 52 is a normally open "on/off" valve, again preferably an electrically operated solenoid valve, which is closed when lifting arms 20 have been raised to the reference height for weighing the load, closing off line 40 and the flow of fluid to the lifting ends of the cylinders, thus halting the lift arm mechanism.

Figure 4:
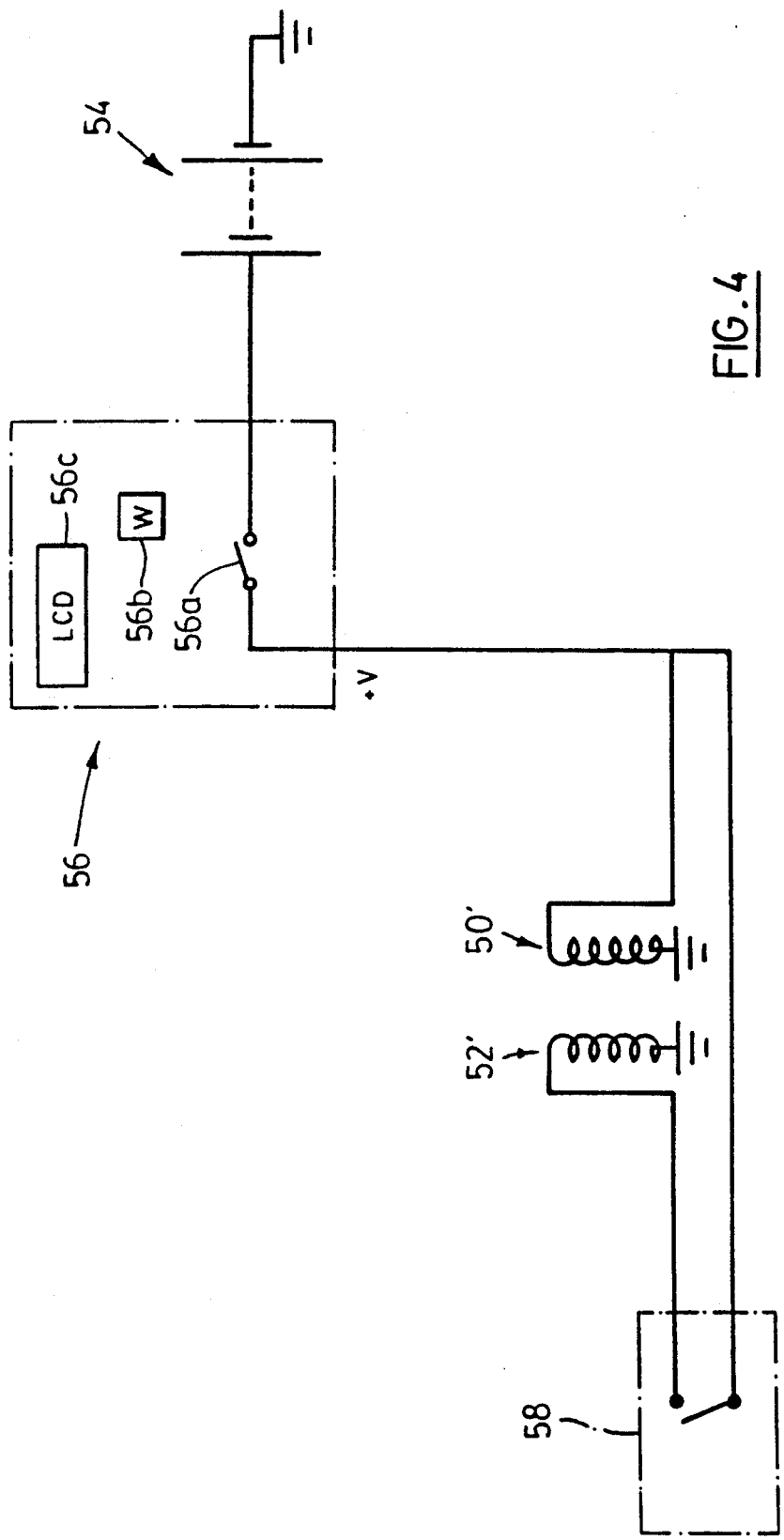
FIG. 4 is a schematic illustration of an electrical system for controlling the operation of the system of FIG. 3.

FIG. 4 is a schematic drawing of an electrical system for controlling the operation of the hydraulic system of the invention, powered by battery 54. Each solenoid valve corresponding to valve means in FIG. 3 is given the same reference number, but primed.

Referring to FIGS. 3 and 4, the operation of the hydraulic system of the invention in controlling the lifting arms 20 of the refuse truck 10 of FIG. 1 weighing refuse container 10 is as follows:

With charged or empty container 12 resting on the ground, master switch means 56 is turned to the "on" position, whereupon a +V signal from battery 54 activates solenoid 50' to open valve 50, thereby making cylinders 24a and 24b effectively single-acting as described above. The truck operator then activates the lift control valve 38 to raise the load to the proper reference height, whereupon switch 58 is closed, activating solenoid 52' to close valve 52, thereby stopping the flow of hydraulic fluid to the cylinders. The operator will then determine the weight of the container in a conventional manner from the back-pressure readings furnished by the transducer P and, that done, will turn master switch 56 to the "off" position, deactivating both solenoids and closing valve 50 and opening valve 52 so that the circuit thereupon functions in the same manner as the double-acting cylinder circuit of FIG. 2.

It will be appreciated that the solenoid-controlled opening and closing of the valves in the control system of the invention in correct sequence for the loading and weighing operation can be largely automated with the assistance of a programmable microprocessor. In the presently preferred embodiment of circuitry schematically illustrated in FIG. 4 master switch means 56, rather than being a manually operated mechanical switch, comprises a relay contact 56a whose opening and closing is controlled by a microcomputer, which also calculates and displays the load weight from the transducer P signal in a conventional manner. Switch 58 could be any of a number of switching elements, such as a simple rod activated microswitch triggered when the lifting arm assembly reaches the desired reference elevation for weighing.

To use this largely automated system, the truck operator first activates the "W" (weigh) key 56b on the keyboard of computer, which closes relay contact 56a, sending the +V signal which causes valve 50 to open and renders the lift arm cylinders effectively single-acting, as discussed above. The operator then raises the load by shifting manual lift control valve 38 to the "lift" position. When the preselected referenced position is reached, switch 58 closes automatically, valve 52 closes, shutting off fluid supply to the lifting lines 40a and 40b, and a weight readout is taken. That readout is shown on the LCD display 56c of the onboard computer. Because solenoid 50' has already been activated by closure of the master switch means 56, the lift arm cylinders are always acting as single-acting cylinders when the load weight is measured. The on-board computer is programmed to open relay contact 56a right after the LCD weight readout is produced to restore double-acting function in the lift arm cylinders.

It has been assumed in the foregoing discussion of FIGS. 3, 4 and 5 that the cylinders 24a and 24b are the cylinders controlling the lifting arms of mobile material handling equipment. However, the modified hydraulic circuitry according to the invention may also be used in the hydraulic circuit of the tilt forks 30 of equipment such as the refuse vehicle of FIG. 1, as these are also double-acting cylinders. The back-pressure sensing transducer P would in that embodiment be located in the lifting circuit line of the tilt fork hydraulic system. The arrangement is analogous to that of FIG. 3, however with 24a and 24b designating the tilt fork cylinders rather than the lift arm cylinders. The operator proceeds by positioning forks 26 into the lifting sleeves 25 at container 12, opening the dump valve in the tilt fork circuit to make the tilt fork cylinders effectively single-acting, lifting arms 20 off the ground by activation of the lift arm cylinders, and obtaining the weight readout.

Whether it is the lift arm cylinders or the tilt fork cylinders of the mobile material handling equipment which are controlled by the circuitry of the present invention, the net weight of material lifted is determined by taking the tare of the empty container in a second lifting and weighing operation. It is a straightforward matter to program the on-board computer to subtract the tare from the previously measured gross weight and automatically display the difference, being the weight of material loaded.

Although the foregoing description and accompanying drawings relate to a refuse collection vehicle having a lift assembly operated by double-acting cylinders configured to lift a load when the cylinder rods are pushed in, it will be appreciated that the invention defined in the claims appended hereto is contemplated for use in a wide range of equivalent material handling equipment using double-acting hydraulic cylinders, for example mobile lifting equipment in which lifting arms are operated to raise a load by causing the cylinder rods to be pushed out of the cylinders. The present disclosure has been made by way of example and changes in details of structure may be made without departing from the spirit thereof.

I claim:

1. In a loader of the kind having an hydraulically operated lift assembly including a load carrier, at least one arm associated therewith, a double-acting hydraulic cylinder operatively connected to said arm, a lift circuit and a lowering circuit for conveying hydraulic fluid under pressure respectively to a first end and to a second end of said double-acting hydraulic cylinder for respectively elevating and lowering said load carrier, and a control valve for switching the flow of hydraulic fluid under pressure between said lift and lowering circuits, and further including transducer means operatively connected to said lift circuit to provide a signal corresponding to the hydraulic pressure within said first end of said hydraulic cylinder, the improvement comprising:

a low-resistance by-pass circuit comprising a return line tapping off from said second end of said hydraulic cylinder and normally-closed remote control valve means in said return line, operable to be open when said at least one arm is being elevated with the load carrier to a predetermined reference weighing position so that pressure build-up in said lowering circuit is avoided and the load weight reading corresponding to the hydraulic pressure in the lifting circuit is representative of the load in said carrier.

2. The improvement as claimed in claim 1, further comprising means responsive to said signal, operable to calculate and display a load weight reading corresponding to said hydraulic pressure.

3. The improvement as claimed in claim 2, further comprising normally-open remote control valve means in said lift circuit, operable to be closed when said at least one lift arm has been elevated to said predetermined weighing position and while taking said load weight reading, so that leakage of hydraulic fluid from the lift control circuit during weighing is minimized.

4. The improvement as claimed in claim 3, wherein said normally-closed and said normally-open remote control valves are electrically operated solenoid valves.

5. The improvement as claimed in claim 4, further comprising first switching means operatively connected to said normally-closed, electrically operated solenoid valve, second switching means operatively connected to said normally-open, electrically operated solenoid valve and electronic sequencing means for controlling the operation of said first and said second switching means.

6. The improvement as defined in claim 5, wherein said means responsive to said signal operable to calculate and display a load weight reading and said electronic sequencing means are both peripherals of a pre-programmed microprocessor.

7. The improvement as claimed in claim 3, wherein said loader is a refuse collection vehicle in which said load carrier is engaged by two tilt forks each having an associated lifting arm, and said at least one arm is each of said lifting arms of the vehicle.

8. The improvement as claimed in claim 3, wherein said loader is a refuse collection vehicle in which said load carrier is engaged by two tilt forks each having an associated lifting arm, and said at least one arm is each of said tilt forks of the vehicle.

* * * * *